United States Patent [19]

Aragaki

[11] Patent Number: 4,903,138

[45] Date of Patent: Feb. 20, 1990

[54] METHOD OF AND APPARATUS FOR ELIMINATING INTERBLOCK DISTORTION DUE TO COMPRESSED IMAGE DATA

[75] Inventor: Masami Aragaki, Kyoto, Japan

[73] Assignee: Dainippon Screen Mfg. Co. Ltd., Japan

[21] Appl. No.: 333,444

[22] Filed: Apr. 5, 1989

[30] Foreign Application Priority Data

May 4, 1988 [JP] Japan ................... 63-84481

[51] Int. Cl.$^4$ ............... H04N 1/41; H04N 1/415; H04N 7/133
[52] U.S. Cl. ................... 358/261.3; 358/133
[58] Field of Search .................. 358/261.3, 133

[56] References Cited

U.S. PATENT DOCUMENTS

| | | | |
|---|---|---|---|
| 4,558,350 | 12/1985 | Murakami | 358/133 |
| 4,581,638 | 4/1986 | Chiariglione | 358/261.3 |
| 4,797,944 | 1/1989 | Tanaka | 358/136 |
| 4,805,030 | 2/1989 | Tanaka | 358/261.3 |

Primary Examiner—Howard W. Britton
Attorney, Agent, or Firm—Ostrolenk, Faber, Gerb & Soffen

[57] ABSTRACT

Interblock distortion often appears on a boundary of pixel blocks in a reproduced image produced from compressed image data. The interblock distortion is eliminated by correcting a density distribution in the reproduced image. First, an average density ($A_{ij}$) of a selected pixel block ($B_{ij}$) is computed. Second, a standard deviation ($\sigma_{ij}$) of a density distribution in the selected deviation is computed. If the standard deviation is equal to zero, correction value distributions ($\Delta f_m$, $\Delta f_n$) along a main scanning direction and a subscanning direction are obtained. Finally, corrected density distribution ($f_{mn}$) is obtained as a sum of the average density and the correction value distributions.

12 Claims, 8 Drawing Sheets

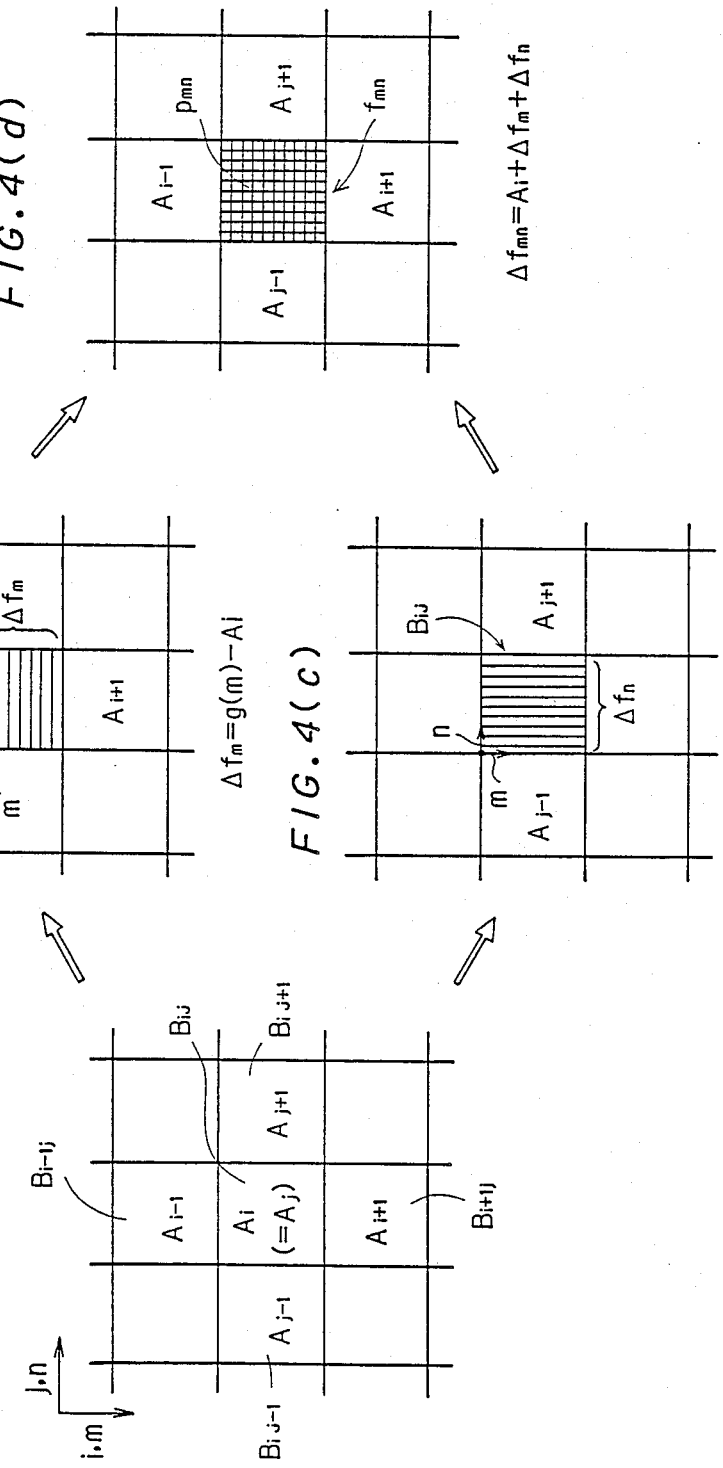

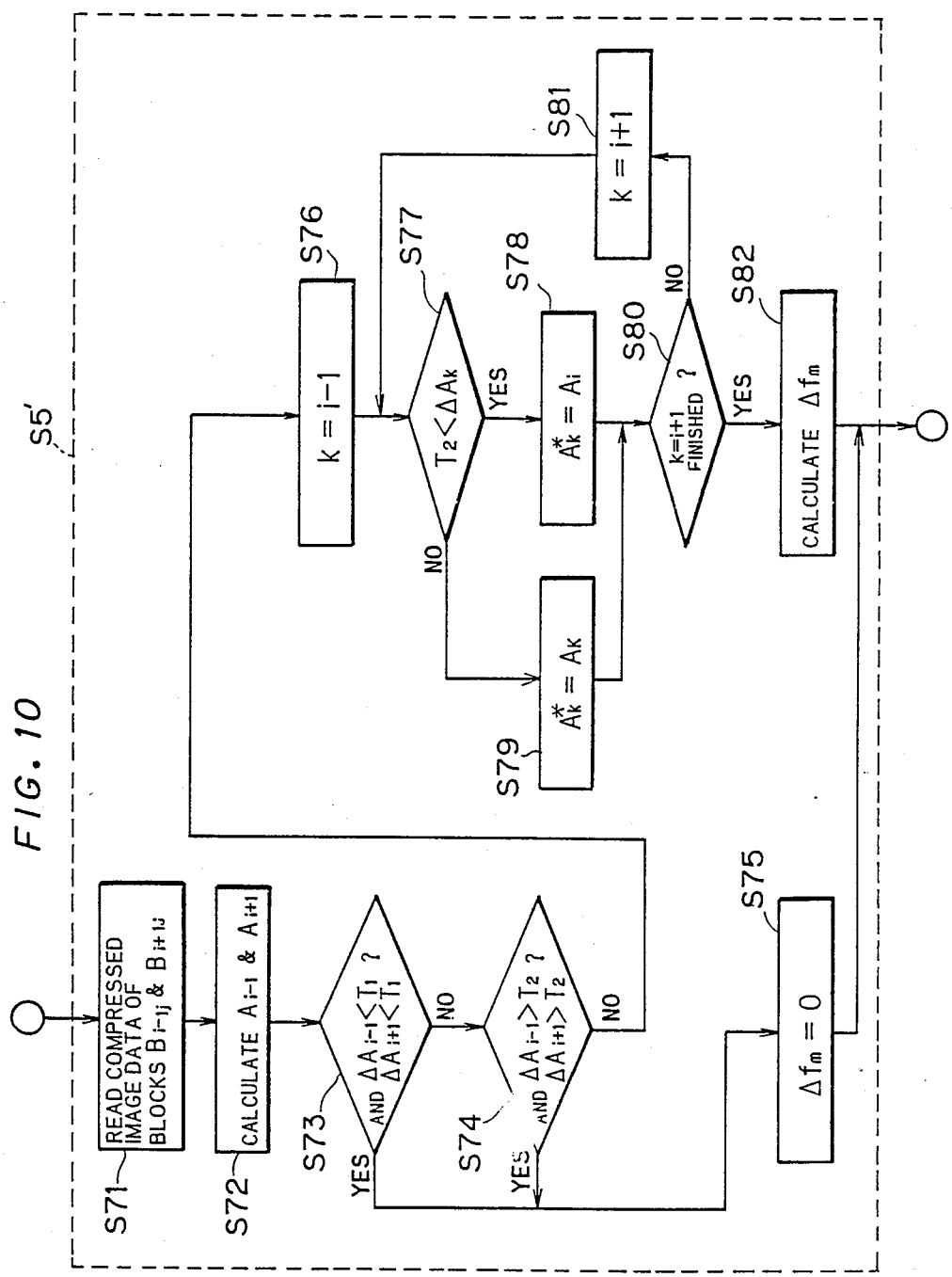

METHOD OF AND APPARATUS FOR ELIMINATING INTERBLOCK DISTORTION DUE TO COMPRESSED IMAGE DATA

BACKGROUND OF THE INVENTION

1. Field of the Invention

The present invention relates to a method of and apparatus for eliminating interblock distortion appearing in a reproduced image which is produced on the basis of compressed image data obtained for each of a plurality of pixel blocks dividing an original image.

2. Description of the Prior Art

An image processor such as a process scanner generally reads an original image to obtain image data for every pixel which is a unit region extremely small compared with the original image. Therefore, if the image data of the original image is stored for every pixel, a great amount of storage capacity is required. In order to cope with such a problem, an original image is divided into a plurality of blocks, whereby image data is compressed for every block in order to reduce storage capacity required for the image data, as is well known in the art.

FIG. 1 is an explanatory diagram showing pixel blocks of an original image. Referring to FIG. 1, an original image 20 is divided into Y, where Y is an integer, along the main scanning direction i and into X, where X is an integer, along the subscanning direction j, to consist of (X×Y) pixels P. It is to be noted that FIG. 1 partially illustrates lines dividing the original image 20 into the pixels. The original image 20 is also divided into a plurality of pixel blocks $B_{ij}$ each of which has a plurality of pixels. Namely, the original image 20 is divided into im along the main scanning direction i and into jm along the subscanning direction j, to have (im×jm) pixel blocks $B_{ij}$. FIG. 2 illustrates arrangement of pixels $P_{mn}$ in one pixel block $B_{ij}$. Referring to FIG. 2, the pixel block $B_{ij}$ is divided into M along the main scanning direction i and into N along the subscanning direction j, to have (M×N) pixels $P_{mn}$. The subscripts m and n indicate coordinate positions of the pixels in one pixel block $B_{ij}$, where the subscript m is associated with the main scanning direction i and the subscript n is associated with the subscanning direction j.

Data compression of image data is performed, for example, by firstly performing orthogonal transformation such as cosine transformation or Hadamard transformation on density distribution of pixels $P_{mn}$ for every pixel block $B_{ij}$ and secondly preserving coefficients obtained by the transformation. The method of the data compression is generally called image encoding, and the number of compressed image data with respect to one pixel block $B_{ij}$ is not more than the number (M×N) of the pixels $P_{mn}$ included in the pixel block $B_{ij}$. Particularly, when density is gently changed in the pixel block $B_{ij}$, compressed image data often consists only of a value of average density in the pixel block $B_{ij}$. FIG. 3 is an explanatory diagram showing three compressed image data which consist only of respective average densities. Referring to FIG. 3, the horizontal axis is the main scanning direction i shown in FIG. 1, and the vertical axis is density value D. FIG. 3 shows density distribution $g_0$ through three pixel blocks $B_{i-1j}$, $B_{ij}$ and $B_{i+1j}$ which are adjacent to each other along the main scanning direction i and compressed image data $A_{i-1}$ to $A_{i+1}$ obtained for respective pixel blocks. Since the density distribution $g_0$ of the original image is gently changed, the compressed image data $A_{i-1}$ to $A_{i+1}$ consist only of respective average densities.

In this specification, the term "density" denotes not only optical density, but also other values corresponding to optical density such as Munsell value, output signal level of an image reader, halftone area rate in halftone image recording and the like.

Thus, the compressed image data $A_{i-1}$ to $A_{i+1}$ consisting only of respective average densities properly express the density distribution $g_0$ of the original image through the respective pixel blocks $B_{i-1j}$ to $B_{i+1j}$. However, interblock distortion, which is a stepwise difference of density, may appear on a boundary between each pair of neighboring pixel blocks. Referring to FIG. 3, differences d and d' appear in boundaries on both sides of the pixel block $B_{ij}$. When the image is reproduced in this state, the difference d and d' are recognized as deterioration in picture quality. Although the interblock distortion is caused as the result of compression of image data, data compressibility decreases if data compression technique or data encoding technique which substantially causes no interblock distortion is applied. Further, these techniques cannot achieve objects such as reduction of storage capacity and facilitation of data transmission because of the low compressibility.

SUMMARY OF THE INVENTION

The present invention is directed to a method of and an apparatus for eliminating interblock distortion, which is seen in a reproduced image produced on the basis of compressed image data obtained for each pixel block consisting of a prescribed number of pixels in the reproduced image and is defined as stepwise density differences on boundaries between the pixel blocks, by correcting a density distribution expressing densities for respective pixels in the pixel blocks, the method comprising the steps of: (a) sequentially selecting the pixel blocks one by one as an object pixel block, (b) obtaining a density distribution in the object pixel block on the basis of the compressed image data, (c) finding a statistical value expressing a standard deviation of the density distribution, (d) comparing the statistical value with a prescribed threshold value expressing a threshold standard deviation, thereby designating the object pixel block as either of a first type to be subjected to a processing for correcting the density distribution and a second type not to be subjected to the processing, and (e) performing the processing when the object pixel block is the first type, the processing comprising the steps of: (e-1) obtaining respective average densities of the object pixel block and neighbor pixel blocks, respectively, the neighbor pixel blocks neighboring the object pixel block in a prescribed direction, and (e-2) correcting the density distribution through interpolation of quantities corresponding to the respective average densities so as to reduce the stepwise density differences on boundaries between the object pixel block and the neighbor pixel blocks, thereby obtaining a corrected density distribution in the object pixel block.

According to an aspect of the present invention, the object pixel block is designated in the step (d) as the first type when the standard deviation is less than the threshold standard deviation, and is designed as the second type when the standard deviation is more than the threshold standard deviation.

According to another aspect of the present invention, the compressed image data is prepared for generating the reproduced image through a combination of a main scanning and a subscanning on an image plane, and the step (e-2) further comprises the steps of: (1) obtaining a first correction function of a first coordinate axis along a main scanning direction, which is defined on the image plane for the reproduced image, where coefficients of the first correction function are specified by the respective average densities of the object pixel block and the neighbor pixel blocks neighboring the object pixel block in the main scanning direction, (2) obtaining a second correction function of a second coordinate axis along a subscanning direction, which is defined different from the main scanning direction on the image plane, where coefficients of the second correction function are specified by the respective average densities of the object pixel block and the neighbor pixel blocks neighboring the object pixel block in the subscanning direction, and (3) computing the corrected density distribution through arithmetical operation using the average density of the object pixel block, the first correction function and the second correction function.

According to still another aspect of the invention, the first and second correction functions are quadratic functions.

Preferably, the first and second correction functions are formed so that the corrected density distribution provides a local average density at any one of the boundaries, which local average density is to be obtained for a row of pixels located at the one of the boundaries, and is equal to an average among the average density of the object pixel block and the average density of one of the neighbor pixel blocks located at the one of the boundaries, and so that an average density of the corrected density distribution in the object pixel block is the same with the average density of the object pixel block.

When a difference between the average density of the object pixel block and the average density of the one of the neighbor pixel blocks is larger than a prescribed threshold value, the first and second correction functions may be obtained of the basis of a neighbor density, which is computed as a value between the average density of the object pixel block and the average density of the one of the neighbor pixel blocks, in place of the average density of the one of the neighbor pixel blocks.

Accordingly, an object of the present invention is to provide a method of and an apparatus for eliminating an interblock distortion, which appears in a reproduced image produced on the basis of compressed image data, by processing the compressed image data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4(a)–4(d) and 5 are diagrams schematically showing methods of the present invention;

FIG. 10 is a flow chart showing procedure according to another embodiment of the present invention.

DESCRIPTION OF THE PREFERRED EMBODIMENTS

Figure 2:
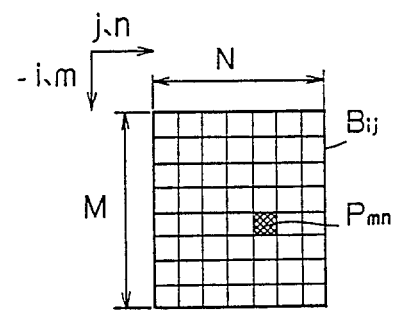
FIG. 2 is a diagram showing pixel arrangement in a pixel block.

FIG. 4 is a diagram showing a method of eliminating interblock distortion according to the present invention. FIG. 4(a) shows a pixel block (hereinafter referred to as "object pixel block") $B_{ij}$ to be processed and four neighbor pixel blocks (hereinafter referred to as "neighbor pixel blocks") $B_{i-1j}$, $B_{i+1j}$, and $B_{ij+1}$. Symbols $A_i$ ($=A_j$), $A_{i-1}$, $A_{i+1}$, $A_{j-1}$ and $A_{j+1}$ denote average densities in corresponding pixel blocks, respectively. The subscript i or j is omitted from each symbol denoting the average density for simplification. For example, $A_{i-1}$ means $A_{i-1j}$ and $A_{j+1}$ means $A_{ij+1}$. Each pixel block has $(M \times N)$ pixels $P_{mn}$, as shown in FIG. 2. The size $(M \times N)$ is usually $(4 \times 4)$, $(8 \times 8)$, $(16 \times 16)$ or the like.

The present invention is adapted to correct compressed image data, to thereby eliminate interblock distortion on boundaries of the object pixel block $B_{ij}$ when the compressed image data of the object pixel block $B_{ij}$ consists only of average density, for example. Compressed image data of the neighbor pixel blocks do not necessarily consist only of average densities as described later, while it is assumed here that all of the image data of the neighbor pixel blocks are also formed only with respective average densities, for simplification.

Figure 5:
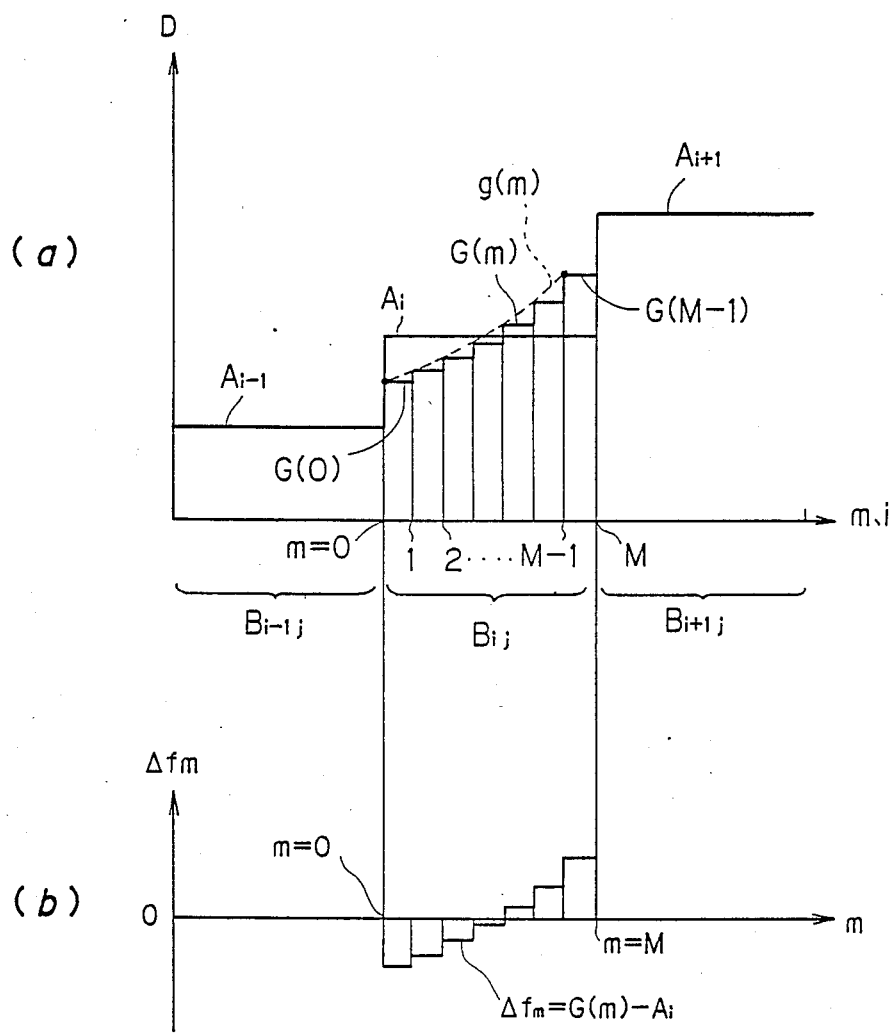

FIG. 5 is a diagram showing a method of correcting density distribution along the main scanning direction i. Referring to FIG. 5(a), the horizontal axis represents pixel coordinate m in the object pixel block $B_{ij}$ along the main scanning direction i, and the vertical axis represents density value D. The average densities $A-1$, $A_i$ and $A_{i+1}$ are obtained for the pixel blocks $B_{i-1j}$, $B_{ij}$ and $B_{i+1j}$, respectively.

A processing desired here is to correct the average density $A_i$ of the object pixel block $B_{ij}$ on the basis of only the average densities $A_{i-1}$, $A_i$ and $A_{i+1}$, thereby to reduce the density difference on the boundaries between the pixel blocks.

First, density distribution after the correction in the object pixel block $B_{ij}$ is assumed to be expressed by the following quadratic function g(m):

$$g(m) = am^2 + bm + c \quad (1)$$

where g(m) is density distribution, m is pixel coordinate along main scanning direction in the object pixel block $B_{ij}$, and a, b and c are coefficients, respectively.

The reason why the fuction g(m) is formed as a quadratic function is as follows: A linear function and a cubic function as well as a quadratic function can be applied to interpolate the density distribution in the object pixel block $B_{ij}$ on the basis of the average densities $A_{i-1}$ and $A_{i+1}$, for example. Now, the three types of functions are compared with one another in respect to quality of a reproduced image and computing time in an apparatus described later and shown in FIG. 6. When a linear function is applied, the quality of a reproduced image is comparatively low because of rough interpolation while the computing time is comparatively short. When a cubic function is applied, on the contrary, the computing time is comparatively long while the quality of a reproduced image is comparatively high. On the other hand, when a quadratic function is applied, the quality of a reproduced image is good and the computing time is appropriate, that is, the quality and the computing time are well balanced. Consequently, a quadratic function is preferable to the other functions for the corrections for eliminating the interblock distortion.

FIG. 5(a) shows an example of the quadratic function g(m) with a broken line. FIG. 5(a) also shows a step function G(m) associated with the secondary function g(m). The step function G(m), holding a value of the quadratic function g(m) at the coordinate m to the coordinate m+1, is expressed as follows:

$$G(m) = g(m) \tag{2}$$

where m=0, 1, ..., M−1.

In order to decide the coefficients a, b and c in the equation (1), the following conditions C1 to C3 and corresponding equations are set:

C1: A density after the correction on the boundary between the pixel blocks $B_{ij}$ and $B_{i-1j}$ is equal to the average value of respective average density values.

$$g(0) = (A_{i-1} + A_i)/2 \tag{3,1}$$

C2: A density after the correction on the boundary between the pixel blocks $B_{ij}$ and $B_{i+1j}$ is equal to the average value of respective average densities.

$$g(M-1) = (A_i + A_{i+1})/2 \tag{3,2}$$

C3: An average density of the corrected density distribution is equal to an original average density before correction:

$$\left[\sum_{m=0}^{M-1} g(m)\right]/M = A_i \tag{3,3}$$

The following three equations are deduced from the equations (1) and (3,1) to (3,3):

$$(A_{i-1} + A_i)/2 = c \tag{4,1}$$

$$(A_i + A_{i+1})/2 = a(M-1)^2 + b(M-1) + c \tag{4,2}$$

$$M A_i = \sum_{m=0}^{M-1} (am^2 + bm + c) \tag{4,3}$$

The equations (4,1) to (4,3) are solved to find the coefficients a, b and c in accordance with the values of $A_{i-1}$, $A_{i+1}$ and M, to thereby specify the equation (1). Assuming that M=8, for example, the equation (1) is transformed into the following equation:

$$g(m) = (A_{i-1} - 2A_i + A_{i+1})m^2/28 + \tag{5}$$

$$(-9A_{i-1} + 14A_i - 5A_{i+1})m/28 + (A_{i-1} + A_i)/2$$

As can be seen in FIG. 5(a), the function g(m) corresponds to a result of interpolation of density between the boundary densities G(0) (=g(0)) and G(M−1) (=g(M−1)) in the object pixel block $B_{ij}$.

In order to correct density distribution of the object pixel block $B_{ij}$ along the main scanning direction m and the subscanning direction n, respectively, correction value distribution $\Delta f_m$ shown in FIG. 5(b) along the main scanning direction m is first obtained. Namely, in place of the corrected density distribution expressed by the step function G(m) along the main scanning direction m, the correction value distribution $\Delta f_m$ is found as follows:

$$\Delta f_m = g(m) - A_i \tag{6}$$

where m=0, 1, ..., M−1

The correction value distribution $\Delta f_m$ substantially expresses differences between the corrected density distribution G(m) and the average density $A_i$ at each pixel coordinate m.

FIG. 5(b) shows the correction value distribution $\Delta f_m$ thus obtained. Referring to FIG. 5(b), the horizontal axis represents pixel coordinate m of the main scanning direction in the object pixel block $B_{ij}$, and the vertical axis represents correction value $\Delta f_m$. The correction value distribution $\Delta f_m$ corrects the average density $A_i$ of the object pixel block $B_{ij}$ only along the main scanning direction m, as shown in FIG. 4(b).

When the object pixel block $B_{ij}$ is positioned in a peripheral portion of the original image, processing is performed as follows: When a coordinate value i of the object pixel block $B_{ij}$ is equal to the maximum value im, for example, the neighbor pixel block $B_{i+1j}$ does not exist. In this case, therefore, the processing by the equations (1) to (6) is performed under the assumption that the average density $A_{i+1}$ of an assumed pixel block $B_{i+1j}$ is equal to the average density $A_i$ of the object pixel block $B_{ij}$. That is, when a neighbor pixel block does not exist, processing is generally performed assuming that there is a neighbor pixel block having an average density identical to that of the object pixel block exists next to the object pixel block.

Then, similar processing is performed as to the subscanning direction n, to find correction value distribution $\Delta f_n$. Detailed description of such processing is omitted, because the following replacement converts the above description for the main scanning direction m into that for the subscanning direction n:

| coordinate | m → n |
|---|---|
| number of division | M → N |
| average density value | $A_{i-1}$, $A_i$, $A_{i+1}$ → $A_{j-1}$, $A_j$, $A_{j+1}$ |

The correction value distribution $\Delta f_n$ corrects the average density $A_j$ (=$A_i$) of the object pixel block $B_{ij}$ only along the subscanning direction n, as shown in FIG. 4(c).

The correction value distribution $\Delta f_m$ and $\Delta f_n$ are added to the initial average density $A_i$, to thereby obtain final corrected density distribution $f_{mn}$:

$$f_{mn} = A_i + \Delta f_m + \Delta f_n \tag{7}$$

Namely, the corrected density distribution $f_{mn}$ is obtained by correction along both of the main scanning direction m and the subscanning direction n and it expresses different densities for respective pixels $P_{mn}$, as schematically shown in FIG. 4(d).

In the corrected density distribution $f_{mn}$, stepwise difference of density are reduced well on the boundaries between the object pixel block $B_{ij}$ and the neighbor pixel blocks and also in the interior of the object pixel block $B_{ij}$, whereby the interblock distortion is mitigated well.

Figure 6:
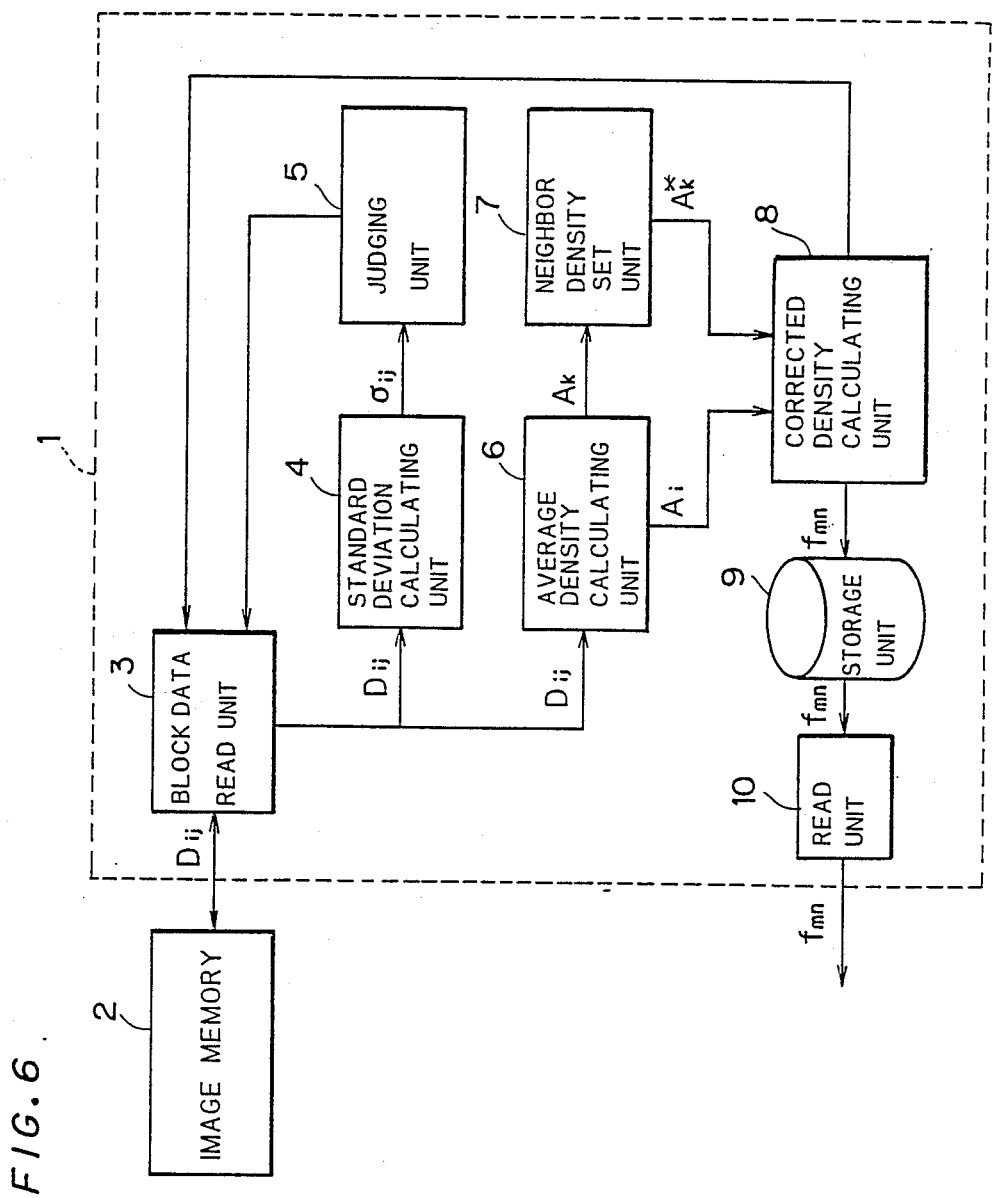
FIG. 6 is a block diagram showing an apparatus according to a preferred embodiment of the present invention.

FIG. 6 is a block diagram schematically showing structure of an apparatus for eliminating interblock distortion according to a preferred embodiment of the present invention. Referring to FIG. 6, the apparatus 1 comprises:

(1) block data read unit 3 for reading compressed image data (or encoded image data)$D_{ij}$ for each pixel block $B_{ij}$ from an image memory 2 provided at the exterior of the apparatus 1;

(2) standard deviation calculating unit 4 for computing a standard deviation $\sigma_{ij}$ of densities of respective pixels in the pixel block on the basis of the compressed image data $D_{ij}$;

(3) judging unit 5 for judging on the basis of the standard deviation $\sigma_{ij}$ whether or not the pixel block $B_{ij}$ is subjected to correction processing;

(4) average density calculating unit 6 for computing an average density $A_i$ in the pixel block $B_{ij}$ on the basis of the compressed image data $D_{ij}$;

(5) neighbor density set unit 7 for setting a neighbor density $A_k^*$ defined as a typical density representing a neighbor pixel block;

(6) corrected density calculating unit 8 for calculating the corrected density distribution $f_{mn}$ in accordance with the method described above;

(7) storage unit 9 for storing the corrected density distribution $f_{mn}$; and (8) read unit 10 for reading the corrected density distribution $f_{mn}$ from the storage means 9 to supply the same to the exterior of the apparatus 1 at need.

The neighbor density set unit 7 is adapted to calculate a neighbor density representing a neighbor pixel block along prescribed processing as hereinafter described when compressed image data of the neighbor pixel block is not composed only of an average density.

The units described above are implemented by a CPU, a microcomputer comprising a memory etc., in practice.

Figure 7:
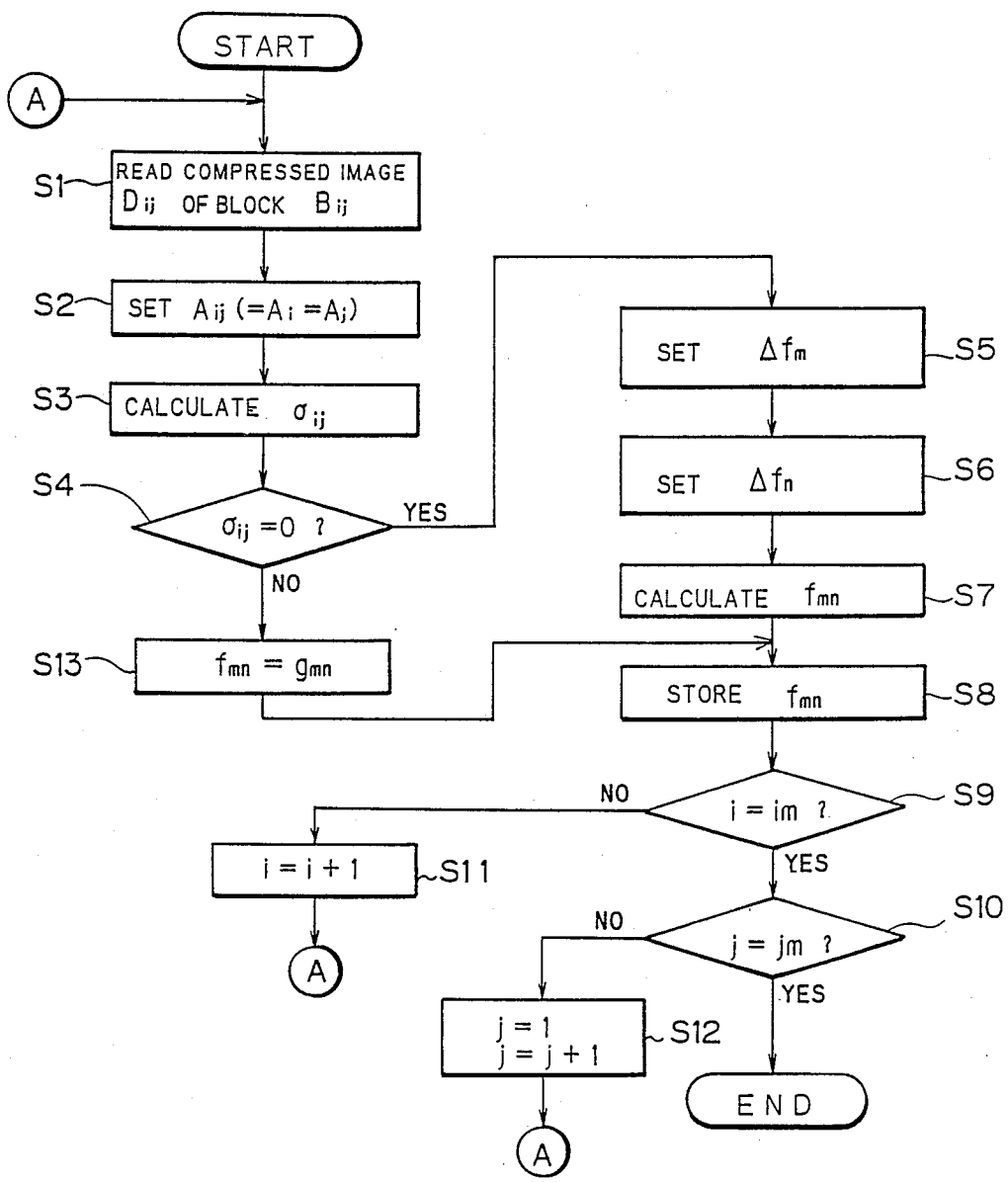
FIGS. 7 and 8 are flow charts showing procedures according to the embodiment.

FIG. 7 is a flow chart showing an example of basic procedure for eliminating interblock distortion from compressed image data by the apparatus 1.

At a step S1, the block data read unit 3 reads the compressed image data $D_{ij}$ of the pixel block $B_{ij}$ from the external image memory 2.

The compressed image data $D_{ij}$ is composed of coefficients which are obtained by performing orthogonal transformation such as discrete cosine transformation or Hadamard transformation on image data of an original. The compressed image data $D_{ij}$ may be compared of other type of data encoded by some method other than the orthogonal transformation. The type of the compressed image data is not particularly restricted, but any type of the compressed image data is employable in the present invention.

At a step S2, the average density calculating unit 6 calculates and sets value of the average density $A_{ij}$ of the object pixel block $B_{ij}$.

At a step S3, the standard deviation calculating unit 4 calculates standard deviation $\sigma_{ij}$ of densities in the pixel block $B_{ij}$ on the basis of the compressed image data $D_{ij}$. The standard deviation $\sigma_{ij}$ is obtained from densities of the respective pixels in the pixel block $B_{ij}$, and $\sigma_{ij}=0$ when the compressed image data $D_{ij}$ is composed only of the average density $A_{ij}$.

The standard deviation $\sigma_{ij}$ is inputted in the judging unit 5, which in turn judges whether or not the standard deviation $\sigma_{ij}$ is equal to zero at a step S4. If the standard deviation $\sigma_{ij}$ is not zero, the compressed image data $D_{ij}$ is not composed only of the average density, but a density value $g_{mn}$ is provided for every pixel in the pixel block $B_{ij}$. Accordingly, no processing for eliminating interblock distortion is performed because no interblock distortion is caused. That is, the process is advanced from the step S4 to a step S13, and further shifted to a step S8 while letting the corrected density distribution $f_{mn}$ be equal to the original density distribution $g_{mn}$. If the standard deviation $\propto_{ij}$ is zero, on the other hand, the compressed image data $D_{ij}$ is composed only of the average density value $A_{ij}$, and hence the processing for eliminating interblock distortion is executed along steps S5 to S7.

At the step S5, the correction value distribution $\Delta f_m$ along the main scanning direction m is calculated in accordance with the equations (1) to (6). At the step S6, the correction value distribution $\Delta f_n$ along the subscanning direction n is calculated in a similar manner. At the step S7, the corrected density distribution $f_{mn}$ is calculated in accordance with the equation (7). The corrected density calculating unit 8 performs the processing through the steps S5 to S7.

The storage unit 9 stores the corrected density distribution $f_{mn}$ of the pixel block $B_{ij}$ thus obtained at the step S8, where the processing as to the pixel block $B_{ij}$ is finished.

Figure 1:
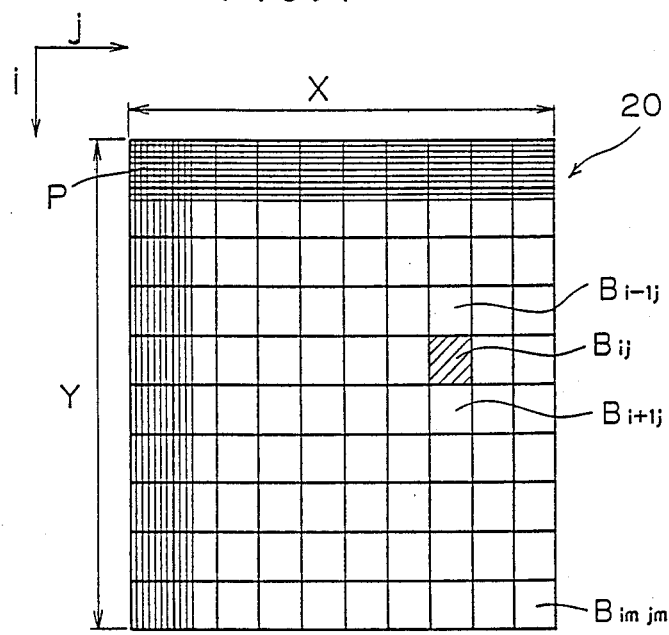
FIG. 1 is a diagram showing pixel blocks of an original image.
Figure 3:
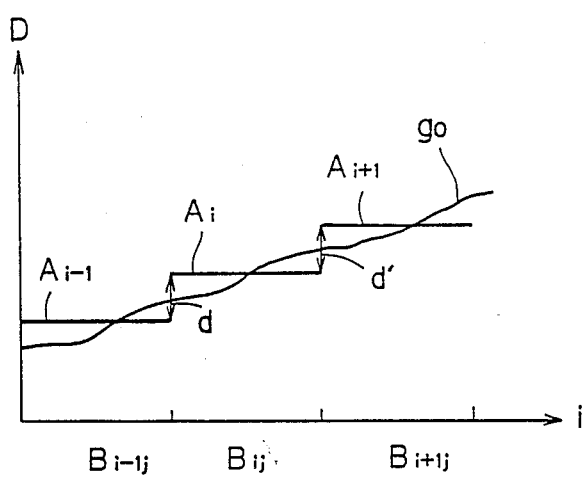
FIG. 3 is a diagram showing appearance of interblock distortion in the prior art.

At a step S9, a judgement is made as to whether or not the coordinate value i of the pixel block $B_{ij}$ is equal to the maximum value im shown in FIG. 1. If the coordinate value i is not equal to the maximum value im, a new coordinate value i (=i+1) is set at a step S11, whereby the processing along the steps S1 to S8 is executed on the pixel block $B_{i+1j}$, which is adjacent to the block $B_{ij}$ along the main scanning direction i.

If a judgement is formed that the coordinate value i is equal to the maximum value im at the step S9, on the other hand, the process is advanced to a step S10, where a judgement is formed whether or not the coordinate value j of the subscanning direction is equal to the maximum value jm. If the coordinate value j is not equal to the maximum value jm, new coordinate values i (=1) and j (=j+1) are set at a step S12, whereby the processing along the steps S1 to S8 is executed for the pixel block $B_{1j+1}$. If a judgement is formed that the coordinate value j is equal to the maximum value jm at the step S10, on the other hand, processing has been completed as to all pixel blocks.

Thus, the corrected density distribution $f_{mn}$ is found as to all pixels in all pixel blocks, to thereby be stored in the storage unit 9. The read unit 10 reads out the corrected density distribution $f_{mn}$ to be supplied to the exterior at need.

Figure 8:
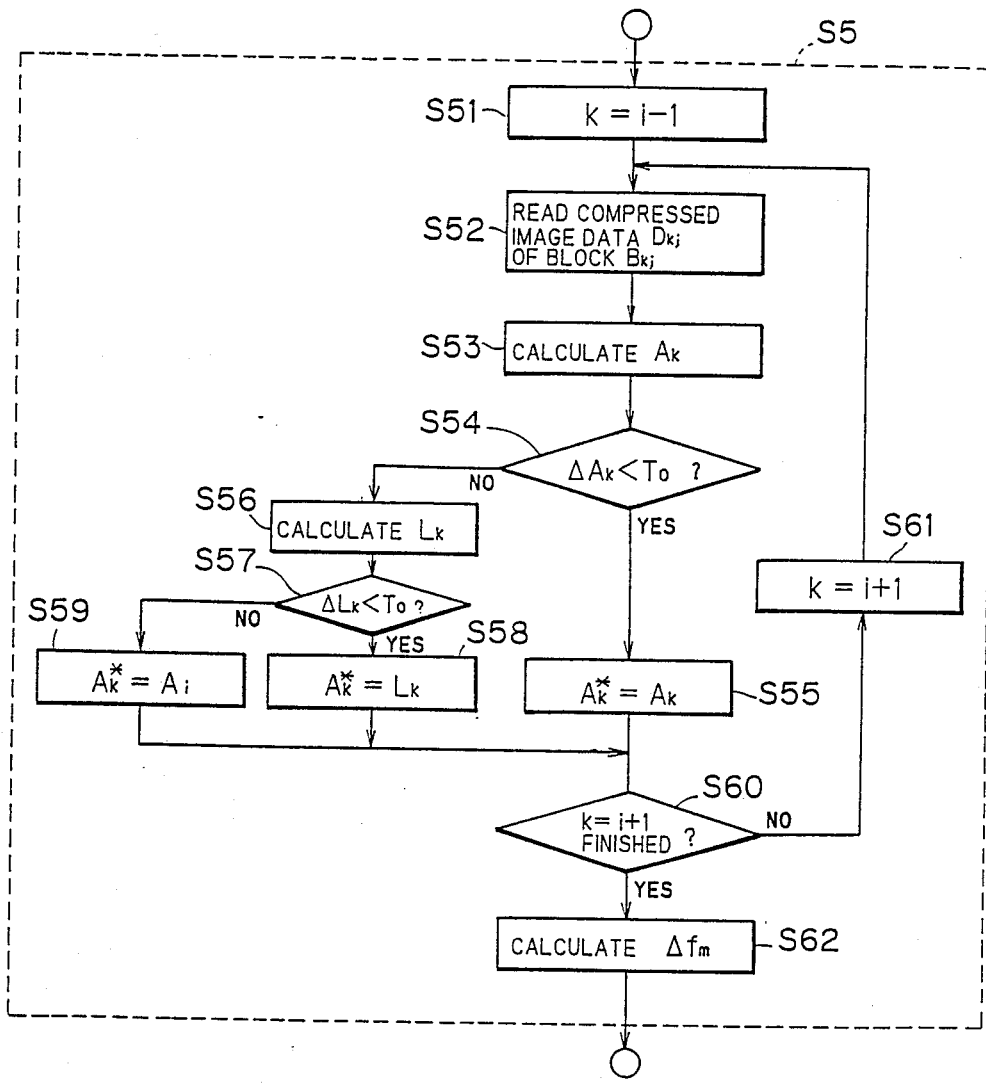

When compressed image data of neighbor pixel blocks are composed only of respective average densities (such pixel blocks are hereinafter simply referred to as "to be uniformalized") in the above processing, the equations (1) to (7) are directly applied. In general, however, neighbor pixel blocks are not uniformalized but have densities which are varied with pixels in the neighbor pixel blocks. In consideration of such case, the step S5 shown in FIG. 7 further includes steps S51 to S62 which are shown in FIG. 8. Processing of these steps S51 to S62 includes processing for setting a typical density (hereinafter simply referred to as "neighbor density") representing a neighbor pixel block in order to apply the equations (1) to (7) to an uniformalized neighbor pixel block.

Referring to FIG. 8, the value of a subscript k ($=i-1$) is set at the step S51, and the block data read unit 3 reads compressed image data $D_{kj}$ of a neighbor pixel block $B_{kj}(=B_{i-1j})$ at the step S52.

Then, at the step S53, the average density calculating unit 6 calculates an average density $A_k (=A_{i-1})$.

At the step S54, a difference $\Delta A_k$ between the average density value $A_i$ of the object pixel block $B_{ij}$ and an average density $A_{kj}$ of the neighbor pixel block $B_{kj}$ is compared with a prescribed threshold value $T_0$. $\Delta A_k$ is provided as follows:

$$\Delta A_k = |A_k - A_i| \quad (8)$$

Figure 9:
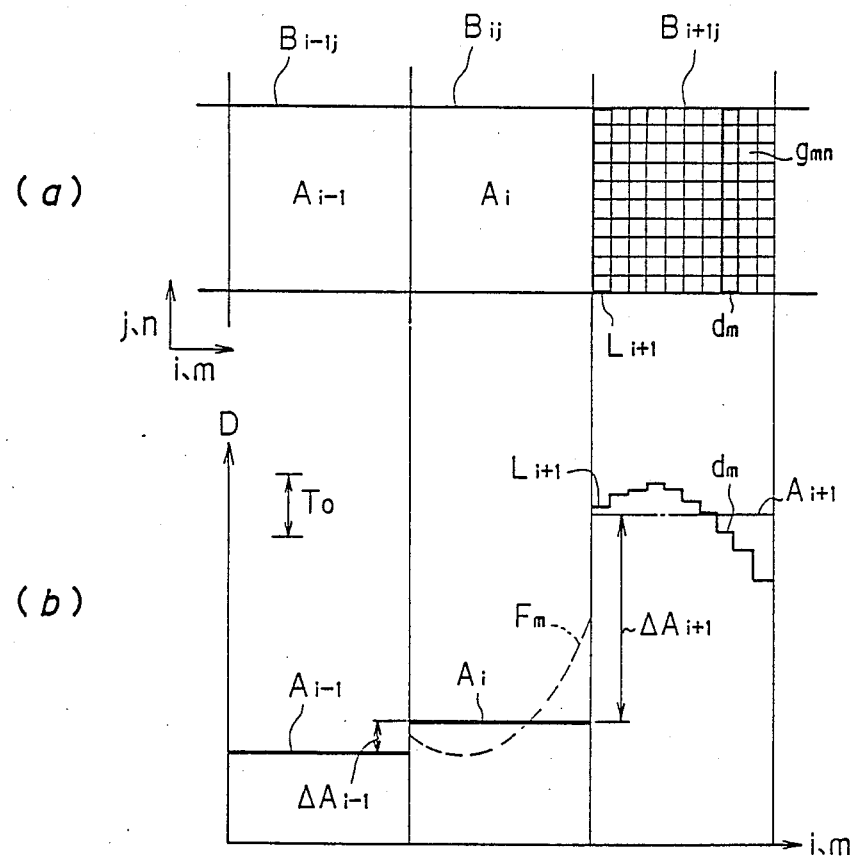
FIG. 9 is a diagram schematically showing processing according to the embodiment.

The threshold value $T_0$ is adapted to judge whether or not the neighbor pixel block $B_{kj}$ is uniformalized. FIG. 9 is a diagram illustrating judgement process with the threshold value $T_0$. FIG. 9(a) shows the object pixel block $B_{ij}$ and neighbor pixel blocks $B_{i-1j}$ and $B_{i+1j}$ along the main scanning direction i. For the convenience of illustration, the main scanning direction i is shown along the horizontal axis. The pixel blocks $B_{i-1j}$ and $B_{ij}$ are respectively uniformalized, and average densities $A_{i-1}$ and $A_i$ are shown in the respective pixel blocks. On the other hand, the pixel block $B_{i+1j}$ is not uniformalized but a density value $g_{mn}$ is provided for every pixel. FIG. g(b) shows distribution of density of these pixel blocks along the main scanning direction i. A density value $d_m$ of the pixel block $B_{i+1j}$ is obtained by averaging the density value $g_{mn}$ of pixels which line up along the subscanning coordinate n at the main scanning coordinate m. FIG. 9(b) also illustrates the threshold value $T_0$.

At the step S54 of FIG. 8, the difference $\Delta A_k$ is compared with the threshold value $T_0$. If $\Delta A_k$ is less than $T_0$, no particular processing is performed but the average density $A_k$ of the neighbor pixel block $B_{kj}$ is directly denoted to be an neighbor density $A_k^*$ at the step S55. This is because the pixel block $B_{kj}(B_{i-1j})$ is supposed to be uniformalized when $\Delta A_k (\Delta A_{i-1})$ is less than $T_0$, as shown in FIG. 9(b).

When $\Delta A_k$ is greater than $T_0$, on the other hand, the neighbor pixel block $B_{kj}$ is supposed not to be uniformalized. In this case, therefore, the process is advanced from the step S54 to the step S56, where an average density $L_k (L_{i+1})$ is computed as to one column of pixels which are adjacent to the object pixel block $B_{ij}$ and are located in the neighbor pixel block $B_{kj} (B_{i+1j})$, as shown in FIG. 9(a).

Then, a difference $\Delta L_k$ between the average density $L_k$ thus obtained and the average density $A_i$ of the object pixel block $B_{ij}$ is compared with the threshold value $T_0$ at the step S57. The difference $\Delta L_k$ is defined as follows:

$$\Delta L_k = |L_k - A_i| \quad (9)$$

If the difference $\Delta L_k$ is less than the threshold value $T_0$, the process is advanced from the step S57 to the step S58, where the density $L_k$ is designated as the neighbor density $A_k^*$.

When the difference $\Delta L_k$ is greater than the threshold value $T_0$, on the other hand, the process is advanced from the step S57 to the step S59, where the average density $A_i$ of the object pixel block $B_{ij}$ is designated as the neighbor density value $A_k^*$. If the density $L_k$ were denoted as the neighbor density in this case, a corrected density distribution $F_m$ shown in FIG. 9(b) by a broken line would be attained. However, actual density distribution of the object pixel block $B_{ij}$ is likely to have far smaller changes than those shown as the density distribution $F_m$, and therefor the density value distribution $F_m$ may be rather abnormal. In this case, therefore, the average density $A_i$ of the object pixel block $B_{ij}$ itself is designated as the adjacent density value $A_k^*$ while no density of the neighbor pixel block $B_{kj}$ is employed.

As described above, the neighbor density $A_k^*$ representing the neighbor pixel block $B_{kj}$ is established at the steps S54 to S59. Then, a judgement is made at the step S60 as to whether or not processing is finished for the case of $k=i+1$. If the processing for obtaining the neighbor density $A_k^*$ for the neighbor pixel block $B_{i+1j}$ is not finished, the process is returned from the step S61 to the step S52, where similar processing is performed. When two neighbor densities $A^*_{i-1}$ and $A^*_{i+1}$ are obtained, the process is advanced from the step S60 to the step S62, where the correction value distribution $\Delta f_m$ is computed along the equations (1) to (6). In this computation, the average densities $A_{i-1}$ and $A_{i+1}$ are replaced by the neighbor densities $A^*_{i-1}$ and $A^*_{i-1}$, respectively, in the equations (1) to (6). The neighbor density set unit 7 performs the processing through the steps S54 to S61, while the corrected density calculating unit 8 performs the step S62.

The threshold value $T_0$ employed in the steps S54 and S57 is preset empirically and experimentally in order to perform the judgements reasonably. Although the steps S54 and S57 employ the same threshold value $T_0$, different threshold values may be used in these steps.

While FIG. 8 shows the details of the step S5 for calculating the correction value distribution $\Delta f_m$ along the main scanning direction m, the step S6 for calculating the correction value distribution $\Delta f_n$ along the subscanning direction n is similar to this and hence detailed description thereof is omitted.

FIG. 10 is a flow chart showing another procedure for performing processing similar to that of FIG. 8. A step S5' shown in FIG. 10 corresponds to the step S5 shown in FIGS. 7 and 8. Referring to FIG. 10, the block data read unit 3 reads respective compressed image data $D_{i-1j}$ and $D_{i+1j}$ of neighbor pixel blocks $B_{i-1j}$ and $B_{i+1j}$ at a step S71. The average density calculating unit 6 calculates respective average densities $A_{i-1}$ and $A_{i+1}$ at a step S72.

At a step S73, differences $\Delta A_{i-1}$ and $\Delta A_{i+1}$ between the average density $A_i$ of the object pixel block $B_{ij}$ and the respective average density values $A_{i-1}$ and $A_{i+1}$ of the neighbor pixel blocks $B_{i-1j}$ and $B_{i+1j}$ are compared with a first threshold value $T_1$, respectively. The first threshold value $T_1$ is preset relatively small, so that the average densities $A_{i-1}$ and $A_{i+1}$ can be thought substantially equal to the average density $A_i$ when both of the difference $\Delta A_{i-1}$ and $\Delta A_{i+1}$ are less than the first threshold value $T_1$. Therefore, if the differences $\Delta A_{i-1}$ and $\Delta A_{i+1}$ are less than the first threshold value $T_1$, no interblock distortion appears on the boundaries of the object pixel block $B_{ij}$, and hence the process is advanced from the step S73 to a step S75, where the processing is finished while the correction value distribution $\Delta f_m$ is set zero.

On the other hand, if at least either the density differences $\Delta A_{i-1}$ and $\Delta A_{i+1}$ is greater than the first threshold value $T_1$, the process is advanced from the step S73 to a step S74, where the density differences $\Delta A_{i-1}$ and $\Delta A_{i+1}$ are compared with a second threshold value $T_2$. The second threshold value $T_2$ is relatively large, and greater than the first threshold value $T_1$. If the correction along the equations (1) to (6) is made with the average densities $A_{i-1}$ and $A_{i+1}$ while the density differences $\Delta A_{i-1}$ and $\Delta A_{i+1}$ are greater than the second threshold value $T_2$, the corrected density distribution $F_m$ shown in FIG. 9(b) is obtained which is thought abnormal. Therefore, when both of the density differences $\Delta A_{i-1}$ and $\Delta A_{i+1}$ are greater than the second threshold value $T_2$, the process is advanced from the step S74 to the step S75, where the processing is finished while the correction value distribution $\Delta f_m$ is set zero.

When at least either of the density differences $\Delta A_{i-1}$ and $\Delta A_{i+1}$ is less than the second threshold value $T_2$, the process is advanced from the step S74 to a step S76 and thereafter, where the neighbor density value $A_k^*$ is established. Thus, processing of the step S76 and subsequent steps is performed in the following cases:

$$\begin{cases} \Delta A_{i-1} < T_1 < T_2, \text{ and} \\ T_1 < T_2 < \Delta A_{i+1} \end{cases} \quad (10, 1)$$

$$\begin{cases} \Delta A_{i-1} < T_1 < T_2, \text{ and} \\ T_1 < \Delta A_{i+1} < T_2, \end{cases} \quad (10, 2)$$

$$\begin{cases} T_1 < \Delta A_{i-1} < T_2, \text{ and} \\ T_1 < T_2 < \Delta A_{i+1} \end{cases} \quad (10, 3)$$

$$\begin{cases} T_1 < \Delta A_{i-1} < T_2, \text{ and} \\ T_1 < \Delta A_{i+1} < T_2 \end{cases} \quad (10, 4)$$

Although there are other cases corresponding to the expressions (10, 1) through (10, 3) where $\Delta A_{i-1}$ and $\Delta A_{i+1}$ are exchanged, such cases are omitted for simplification.

A value of the subscript k ($=i-1$) is set at the step S76, and the density difference $\Delta A_k$ ($\Delta A_{i-1}$) is compared with the second threshold value $T_2$ at a step S77. If the density difference $\Delta A_k$ is greater than the second threshold value $T_2$, the process is advanced to a step S78, where the average density $A_i$ of the object pixel block $B_{ij}$ is designated as the neighbor density $A_k^*$. This is because the corrected density distribution becomes rather abnormal if the average density $A_k$ of the neighbor pixel block $B_{kj}$ is designated as the neighbor density $A_k^*$, as described before.

If the density difference $\Delta A_k$ is less than the second threshold value $T_2$, on the other hand, the average density $A_k$ of the neighbor pixel block $B_{kj}$ is designated as the neighbor density $A_k^*$.

Steps S80 and S81 are adapted to process the other neighbor pixel block $B_{i+1j}$.

Thus, the two neighbor densities $A_{i-1}^*$ and $A_{i+1}^*$ are established at the step S78 and/or S79. Under conditions corresponding to the above expressions (10, 1) to (10, 4), the neighbor densities $A_{i-1}^*$ and $A_{i+1}^*$ are respectively set as follows:

$$A^*_{i-1} = A_{i-1}, A^*_{i+1} = A_i \quad (11, 1)$$

$$A^*_{i-1} = A_{i-1}, A^*_{i+1} = A_{i+1} \quad (11, 2)$$

$$A^*_{i-1} = A_{i-1}, A^*_{i+1} = A_i \quad (11, 3)$$

$$A^*_{i-1} = A_{i-1}, A^*_{i+1} = A_{i+1} \quad (11, 4)$$

Namely, the average density $A_i$ of the object pixel block $B_{ij}$ is designated as the neighbor density $A_k^*$ only when the density difference $\Delta A_k$ ($\Delta A_{i-1}$ or $\Delta A_{i+1}$) is greater than the second threshold value $T_2$. A case that the density difference $\Delta A_k$ is less than the first threshold value $T_1$ is not considered here because the average density $A_i$ of the object pixel block $B_{ij}$ is substantially equal to the average density $A_k$ of the neighbor pixel block $B_{kj}$ in this case, and the average density $A_k$ can be designated as the adjacent density value $A_k^*$.

At a step S82, the correction value distribution $\Delta f_m$ is calculated with the two neighbor densities $A_{i-1}^*$ and $A_{i+1}^*$ thus established. In this calculation, the average densities $A_{i-1}$ and $A_{i+1}$ are replaced by the neighbor densities $A_{i-1}^*$ and $A_{i+1}^*$, respectively, in the equations (1) to (6). The neighbor density set unit 7 performs the processing of the steps S73 to S81, while the corrected density calculating unit 8 performs the step S82.

The processing of the steps S71 to S82 eliminate the interblock distortion only on the basis of the average density $A_i$ of the object pixel block and the average densities $A_k$ of the neighbor pixel blocks, and the processing is easier than that of the steps S51 to S62 shown in FIG. 8. Further, the processing of the steps S71 to S82 can be also applied for eliminating the interblock distortion when the compressed image data of pixel blocks are composed only of average densities.

The correction value distribution $\Delta f_n$ along the subscanning direction n is calculated similarly to the above processing, and hence its description is omitted.

Although the present invention has been described with reference to its embodiment, the present invention is not restricted to the above embodiment but the following modifications are also employable.

Although the standard deviation $\sigma_{ij}$ and the average density $A_{ij}$ are calculated on the basis of the compressed image data $D_{ij}$, these data $\sigma_{ij}$ and $A_{ij}$ may be obtained in advance to be included in the compressed image data $D_{ij}$. In this case, the standard deviation calculating unit 4 and the average density calculating unit 6 shown in FIG. 6 can be removed.

In the procedure shown in FIG. 7, the processing of the steps S5 to S7 is performed only when the standard deviation $\sigma_{ij}$ of the object pixel block $B_{ij}$ is zero at the step S4. However, the processing of the steps S5 to S7 may be performed when the standard deviation $\sigma_{ij}$ is less than a prescribed threshold value $\sigma_0$. The threshold value $\sigma_0$ is adapted to judge that density distribution in the object pixel block $B_{ij}$ is almost uniform when the standard deviation $\sigma_{ij}$ is less than the threshold value $\sigma_0$. The threshold value $\sigma_0$ is empirically and experimentally determined.

The neighbor density $A_k^*$ is established on the basis of the difference $\Delta A_k$ between the average density $A_i$ ($=A_j$) of the object pixel block $B_{ij}$ and the average density $A_k$ of the neighbor pixel block $B_{kj}$ (k=i−1 or i+1). For example, the neighbor density $A_k^*$ may be set at a certain value between the average density $A_i$ of the object pixel block $B_{ij}$ and the average density $A_k$ of the neighbor pixel block $B_{kj}$. However, the neighbor density $A_k^*$ may be obtained with another data of the compressed image data $D_{kj}$ of the neighbor pixel block $B_{ij}$. In other words, the neighbor density $A_k^*$ may be set at a typical density representing the neighbor pixel block $B_{kj}$ on the basis of the average density $A_i$ of the object pixel block $B_{ij}$ and the compressed image data $D_{kj}$ of the neighbor pixel block $B_{kj}$.

The correction value distribution $\Delta f_m$ is specified by the coefficients a, b and c, which are decided with the average density $A_i$ and the neighbor density $A_k^*$, and is expressed by the quadratic function having the pixel coordinate m along the main scanning direction as a variable. However, the functional form of the correction value distribution $\Delta f_m$ is not restricted to a quadratic function but various functional forms such as a liner function and the like are applicable while conditions different from those of the expressions (4, 1) to (4, 3) are set for deciding coefficients in accordance with the functional form. Further, a condition for deciding coefficients of the same functional form is not restricted to one but various modifications are available. Namely, the correction density value distribution may be calculated through a function which has coefficients decided on the basis of the average density value and the neighbor densities, and has variables expressing pixel coordinates in the object pixel block.

The correction value distributions $\Delta f_m$ and $\Delta f_n$ are so defined that the corrected density distribution $f_{mn}$ is obtained by obtaining the sum with the average density $A_i$ as in the equation (7). However, the correction value distributions may be so defined that the corrected density distribution may be obtained through other arithmetical operation such as multiplication of the correction value distributions with the average density or subtraction. In this case, the operation of the equation (7) is modified accordingly.

In the above embodiment, the correction value distribution $\Delta f_m$ along the main scanning direction m and the correction value distribution $\Delta f_n$ along the subscanning direction n are obtained for one pixel block $B_{ij}$, and the similar distributions of the next pixel block are obtained after the corrected density distribution $f_{mn}$ of the object pixel block $B_{ij}$ is obtained. However, other procedure is also applicable such as the correction value distribution $\Delta f_m$ along the main scanning direction m is firstly obtained for all of the pixel blocks, the corrected value distribution values $\Delta f_n$ along the subscanning direction n is secondly obtained for all of the pixel blocks, and then corrected density distribution $f_{mn}$ is finally obtained for all the pixel blocks.

According to the present invention, interblock distortion on boundaries between pixel blocks is eliminated only on the basis of compressed image data, whereby the elimination of the interblock distortion can be easily executed without reducing data compressibility of the compressed image data.

Although the present invention has been described and illustrated in detail, it is clearly understood that the same is by way of illustration and example only and is not to be taken by way of limitation, the spirit and scope of the present invention being limited only be the terms of the appended claims.

What is claimed is:

1. A method of eliminating interblock distortion, which is seen in a reproduced image produced on the basis of compressed image data obtained for each pixel block consisting of a prescribed number of pixels in said reproduced image and is defined as stepwise density difference on boundaries between said pixel blocks, by correcting a density distribution expressing densities for respective pixels in said pixel blocks, said method comprising the steps of:
   (a) sequentially selecting said pixel blocks one by one as an object pixel block,
   (b) obtaining a density distribution in said object pixel block on the basis of said compressed image data,
   (c) finding a statistical value expressing a standard deviation of said density distribution,
   (d) comparing said statistical value with a prescribed threshold value expressing a threshold standard deviation, thereby designating said object pixel block as either of a first type to be subjected to a processing for correcting said density distribution and a second type not to be subjected to said processing, and
   (e) performing said processing when said object pixel block is said first type, said processing comprising the steps of:
   (e-1) obtaining respective average densities of said object pixel block and neighbor pixel blocks neighboring said object pixel block in a prescribed direction, and
   (e-2) correcting said density distribution through interpolation of quantities corresponding to said respective average densities so as to reduce said stepwise density differences on boundaries between said object pixel block and said neighbor pixel blocks, thereby obtaining a corrected density distribution in said object pixel block.

2. A method in accordance with claim 1, wherein said object pixel block is designated in said step (d) as said first type when said standard deviation is less than said threshold standard deviation, and is designated as said second type when said standard deviation is more than said threshold standard deviation.

3. A method in accordance with claim 2, wherein
   said compressed image data is prepared for generating said reproduced image through a combination of a main scanning and a subscanning on an image plane, and
   said step (e-2) further comprises the steps of:
   (1) obtaining a first correction function of a first coordinate axis along a main scanning direction, which is defined on said image plane for said reproduced image, where coefficients of said first correction function are specified by said respective average densities of said object pixel block and said neighbor pixel blocks neighboring said object pixel block in said main scanning direction,
   (2) obtaining a second correction function of a second coordinate axis along a subscanning direction, which is defined different from said main scanning direction on said image plane, where coefficients of said second correction function are specified by said respective average densities of said object pixel block and said neighbor pixel blocks neighboring said object pixel block in said subscanning direction, and
   (3) computing said corrected density distribution through arithmetical operation using said average density of said object pixel block, said first correction function and said second correction function.

4. A method in accordance with claim 3, wherein said first and second correction functions are quadratic functions.

5. A method in accordance with claim 4, wherein
said corrected density distribution provides a local average density at any one of said boundaries, which local average density is to be obtained for a row of pixels located at said one of said boundaries,
said first and second correction functions are so defined as to satisfy the following conditions (A-1) and (A-2):
(A-1) said local average density is equal to an average of said average density of said object pixel block and said average density of one of said neighbor pixel blocks neighboring said object pixel block across said one of said boundaries,
(A-2) an average density of said corrected density distribution in said object pixel block is the same with said average density of said object pixel block.

6. A method in accordance with claim 5, wherein the step (e-2) further includes the steps of:
(4) calculating a difference between said average density of said object pixel block and said average density of said one of said neighbor pixel blocks,
(5) comparing said difference with a prescribed threshold value, to thereby find a neighbor pixel block in which said difference is larger than said threshold value,
(6) finding a value between said average density of said object pixel block and said average density of said neighbor pixel block found in the step (5),
(7) defining a neighbor density by said value, and
(8) modifying said first and second correction functions by replacing said average density of said one of said neighbor pixel blocks with said neighbor density in determination of said first and second correction functions.

7. An apparatus for eliminating interblock distortion, which is seen in a reproduced image produced on the basis of compressed image data obtained for each pixel block consisting of a prescribed number of pixels in said reproduced image and is defined as stepwise density differences on boundaries between said pixel blocks, by correcting a density distribution expressing densities for respective pixels in said pixel blocks, said apparatus comprising:
(a) a first processor means for sequentially selecting said pixel blocks one by one as an object pixel block,
(b) a second processor means for obtaining a density distribution in said object pixel block on the basis of said compressed image data,
(c) a third processor means for finding a statistical value expressing a standard deviation of said density distribution,
(d) a fourth processor means for comparing said statistical value with a prescribed threshold value expressing a threshold standard deviation, thereby designating said object pixel block as either of a first type to be subjected to a processing for correcting said density distribution and a second type not to be subjected to said processing, and
(e) a fifth processor means for performing said processing when said object pixel block is said first type, said processing comprising:
(e-1) a six processor means for obtaining respective average densities of said object pixel block and neighbor pixel blocks neighboring said object pixel block in a prescribed direction, and (e-2) a seventh processor means for correcting said density distribution through interpolation of quantities corresponding to said respective average densities so as to reduce said stepwise density differences on boundaries between said object pixel block and said neighbor pixel blocks, thereby obtaining a corrected density distribution in said object pixel block.

8. An apparatus in accordance with claim 7, wherein
said fourth processor means designates said object pixel block as said first type when said standard deviation is less than said threshold standard deviation, and as said second type when said standard deviation is more than said threshold standard deviation.

9. An apparatus in accordance with claim 8, wherein
said compressed image data is prepared for generating said reproduced image through a combination of a main scanning and a subscanning on an image plane, and
said seventh processor means further comprises:
(1) an eighth processor means for obtaining a first correction function of a first coordinate axis along a main scanning direction, which is defined on said image plane for said reproduced image, where coefficients of said first correction function are specified by said respective average densities of said object pixel block and said neighbor pixel blocks neighboring said object pixel block in said main scanning direction,
(2) a ninth processor means for obtaining a second correction function of a second coordinate axis along a subscanning direction, which is defined different from said main scanning direction on said image plane, where coefficients of said second correction function are specified by said respective average densities of said object pixel block and said neighbor pixel blocks neighboring said object pixel block in said subscanning direction, and
(3) a tenth processor means for computing said corrected density distribution through arithmetical operation using said average density of said object pixel block, said first correction function and said second correction function.

10. An apparatus in accordance with claim 9, wherein said first and second correction functions are quadratic functions.

11. An apparatus in accordance with claim 10, wherein
said corrected density distribution provides a local average density at any one of said boundaries, which local average density is to be obtained for a row of pixels located at said one of said boundaries,
said eighth and ninth processor means form said first and second correction functions, respectively, so that:
(A-1) said local average density is equal to an average among said average density of said object pixel block and said average density of one of said neighbor pixel blocks neighboring said object pixel block across said one of said boundaries, and
(A-2) an average density of said corrected density distribution in said object pixel block is the same with said average density of said object pixel block.

12. An apparatus in accordance with claim 11, wherein
said seventh processor means further includes:
(4) means for calculating a difference between said average density of said object pixel block and said average density of said one of said neighbor pixel blocks,
(5) means for comparing said difference with a prescribed threshold value, to thereby find a neighbor pixel block in which said difference is larger than said threshold value,
(6) means for finding a value between said average density of said object pixel block and said average density of said neighbor pixel block found by said means (5),
(7) means for defining a neighbor density by said value, and
(8) means for modifying said first and second correction functions by replacing said average density of said one of said neighbor pixel blocks with said neighbor density in determination of said first and second correction functions.

\* \* \* \* \*